US010482830B2

(12) United States Patent
Choi

(10) Patent No.: US 10,482,830 B2
(45) Date of Patent: Nov. 19, 2019

(54) DISPLAY APPARATUS

(71) Applicant: LG ELECTRONICS INC., Seoul (KR)

(72) Inventor: Inhyuk Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 9 days.

(21) Appl. No.: 15/808,499

(22) Filed: Nov. 9, 2017

(65) Prior Publication Data

US 2018/0130425 A1    May 10, 2018

(30) Foreign Application Priority Data

Nov. 9, 2016    (KR) .......................... 10-2016-0148973

(51) Int. Cl.
*G06F 3/14* (2006.01)
*G09G 3/34* (2006.01)
(Continued)

(52) U.S. Cl.
CPC ......... *G09G 3/342* (2013.01); *G02F 1/13336* (2013.01); *G02F 1/133385* (2013.01);
(Continued)

(58) Field of Classification Search
CPC ......... G02F 1/133385; G02F 1/133602; G02F 1/133603; G02F 1/133606;
(Continued)

(56) References Cited

U.S. PATENT DOCUMENTS 5,805,117 A * 9/1998 Mazurek ............. G02F 1/13336
248/919
5,867,236 A * 2/1999 Babuka ................. G02F 1/1339
349/73

(Continued)

FOREIGN PATENT DOCUMENTS

KR    1020140072428    6/2014

OTHER PUBLICATIONS

European Patent Office Application Serial No. 17200509.2, Search Report dated Jun. 13, 2018, 20 pages.

*Primary Examiner* — Tony O Davis
(74) *Attorney, Agent, or Firm* — Lee, Hong, Degerman, Kang & Waimey PC

(57) ABSTRACT

The present invention relates to a display apparatus. According to an embodiment of the present invention, the display apparatus comprises a plurality of displays adjacently arranged, wherein each of the plurality of displays comprises a panel, a bezel surrounding the panel, and a plurality of light sources disposed on a circuit board and configured to output light to the panel, wherein the plurality of light sources comprises a first light source disposed at a first area of the circuit board the bezel and a second light source disposed at a second area of the circuit board, wherein the first area is adjacent to the bezel, and wherein a first current is provided to the first light source and a second current is provided to the second light source and the second current is smaller than the first current. Thereby, decrease in brightness in areas near the bezel can be compensated for, and uniform brightness can be implemented throughout the displays.

20 Claims, 21 Drawing Sheets

(51) Int. Cl.
*G02F 1/1333* (2006.01)
*G02F 1/1335* (2006.01)
*G09G 3/36* (2006.01)

(52) U.S. Cl.
CPC .. *G02F 1/133602* (2013.01); *G02F 1/133603* (2013.01); *G02F 1/133606* (2013.01); *G02F 1/133608* (2013.01); *G02F 1/133611* (2013.01); *G06F 3/1446* (2013.01); *G09G 3/3426* (2013.01); *G02F 2001/133601* (2013.01); *G09G 3/3674* (2013.01); *G09G 3/3685* (2013.01); *G09G 2300/026* (2013.01); *G09G 2310/0232* (2013.01); *G09G 2320/0233* (2013.01); *G09G 2320/0626* (2013.01)

(58) Field of Classification Search
CPC ......... G02F 1/133608; G02F 1/133611; G02F 2001/133601; G02F 1/13336; G06F 3/1446; G09G 2300/026; G09G 2310/0232; G09G 2320/0233; G09G 2320/0626; G09G 3/342; G09G 3/3426; G09G 3/3674; G09G 3/3685
USPC ............... 345/1.1, 85, 88, 204, 690
See application file for complete search history.

(56) References Cited

U.S. PATENT DOCUMENTS

| | | | |
|---|---|---|---|
| 6,057,898 A * | 5/2000 | Itoh | G02F 1/13336 349/153 |
| 6,476,779 B1 * | 11/2002 | Yano | G09G 3/20 345/1.3 |
| 6,690,337 B1 * | 2/2004 | Mayer | G06F 1/1601 345/1.1 |
| 6,690,344 B1 * | 2/2004 | Takeuchi | G09G 3/3473 345/204 |
| 6,888,524 B2 * | 5/2005 | Bayrle | G09G 3/36 345/88 |
| 6,897,855 B1 * | 5/2005 | Matthies | G02F 1/13336 257/E25.032 |
| 7,286,120 B2 * | 10/2007 | Van Brocklin | G02F 1/13336 345/204 |
| 9,053,648 B1 * | 6/2015 | Lee | G02B 3/0037 |
| 9,250,853 B2 * | 2/2016 | Yun | G06F 3/1446 |
| 9,741,785 B2 * | 8/2017 | Bower | G06F 3/044 |
| 2006/0256035 A1 * | 11/2006 | Kondo | G06F 3/1446 345/1.1 |
| 2007/0103583 A1 * | 5/2007 | Burnett | H04N 9/3147 348/383 |
| 2008/0158468 A1 * | 7/2008 | Kim | G02F 1/13336 349/58 |
| 2008/0284947 A1 * | 11/2008 | Li | G02F 1/133609 349/73 |
| 2010/0020267 A1 | 1/2010 | Kobayashi et al. | |
| 2012/0224107 A1 * | 9/2012 | Mouri | G02F 1/133603 348/731 |
| 2013/0044509 A1 * | 2/2013 | Chung | G02F 1/133606 362/602 |
| 2013/0222754 A1 | 8/2013 | Kohtoku | |
| 2013/0241976 A1 | 9/2013 | Kang et al. | |
| 2014/0043380 A1 | 2/2014 | Ichioka et al. | |
| 2014/0307473 A1 * | 10/2014 | Chen | G02B 6/0068 362/613 |
| 2015/0371594 A1 * | 12/2015 | Huang | G09G 3/003 345/690 |
| 2016/0360192 A1 * | 12/2016 | Cheng | G09G 3/3413 |

* cited by examiner (a)

(b)

(a)

(b)

(a)

(b)

DISPLAY APPARATUS

CROSS-REFERENCE TO RELATED APPLICATION

Pursuant to 35 U.S.C. § 119(a), this application claims the benefit of earlier filing date and right of priority to Korean Patent Application No. 10-2016-0148973, filed on Nov. 9, 2016, the contents of which are hereby incorporated by reference herein in its entirety.

BACKGROUND OF THE INVENTION

1. Field of the Invention

The present invention relates to a display apparatus, and more particularly, to a display apparatus capable of compensating for decrease in brightness of a peripheral area of a bezel, thereby achieving uniform brightness throughout a display.

2. Description of the Related Art

The display apparatus is an apparatus for outputting an image. The display apparatus may output an image through a display panel or project an image to the outside using visible light or the like.

There is an increasing tendency to place commercial display apparatuses outdoors.

In particular, for a commercial display apparatus, a plurality of displays is consecutively arranged.

In this case, brightness in the peripheral area of the bezel surrounding the displays is lower than that in the central areas of the displays. Particularly, when a plurality of displays is consecutively arranged, this issue is more pronounced.

SUMMARY OF THE INVENTION

Therefore, the present invention has been made in view of the above problems, and it is an object of the present invention to provide a display apparatus capable of compensating for decrease in brightness in a peripheral area of a bezel and exhibiting uniform brightness throughout the display.

In accordance with an aspect of the present invention, the above and other objects can be accomplished by the provision of a display apparatus comprising a plurality of displays adjacently arranged, wherein each of the plurality of displays comprises a panel, a bezel surrounding the panel, and a plurality of light sources disposed on a circuit board and configured to output light to the panel, wherein the plurality of light sources comprises a first light source disposed at a first area of the circuit board the bezel and a second light source disposed at a second area of the circuit board, wherein the first area is adjacent to the bezel, and wherein a first current is provided to the first light source and a second current is provided to the second light source and the second current is smaller than the first current.

In accordance with another aspect of the present invention, there is provided a display apparatus comprising a plurality of displays adjacently arranged, wherein each of the displays comprises a plurality of light sources, a bezel surrounding the plurality of light sources, and a light source driving unit, wherein the plurality of light sources comprises a first light source disposed at a first area of a circuit board and a second light source disposed at a second area of the circuit board, wherein the first area is adjacent to the bezel and the second area is surrounded by the first area, wherein the light source driving unit is configured to cause a first current to be provided to the first light source and a second current to be provided to the second light source and wherein the second current is smaller than the first current.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

As used herein, the suffixes "module" and "unit" are added to simply facilitate preparation of this specification and are not intended to suggest special meanings or functions. Therefore, the suffixes "module" and "unit" may be used interchangeably.

Figure 1:
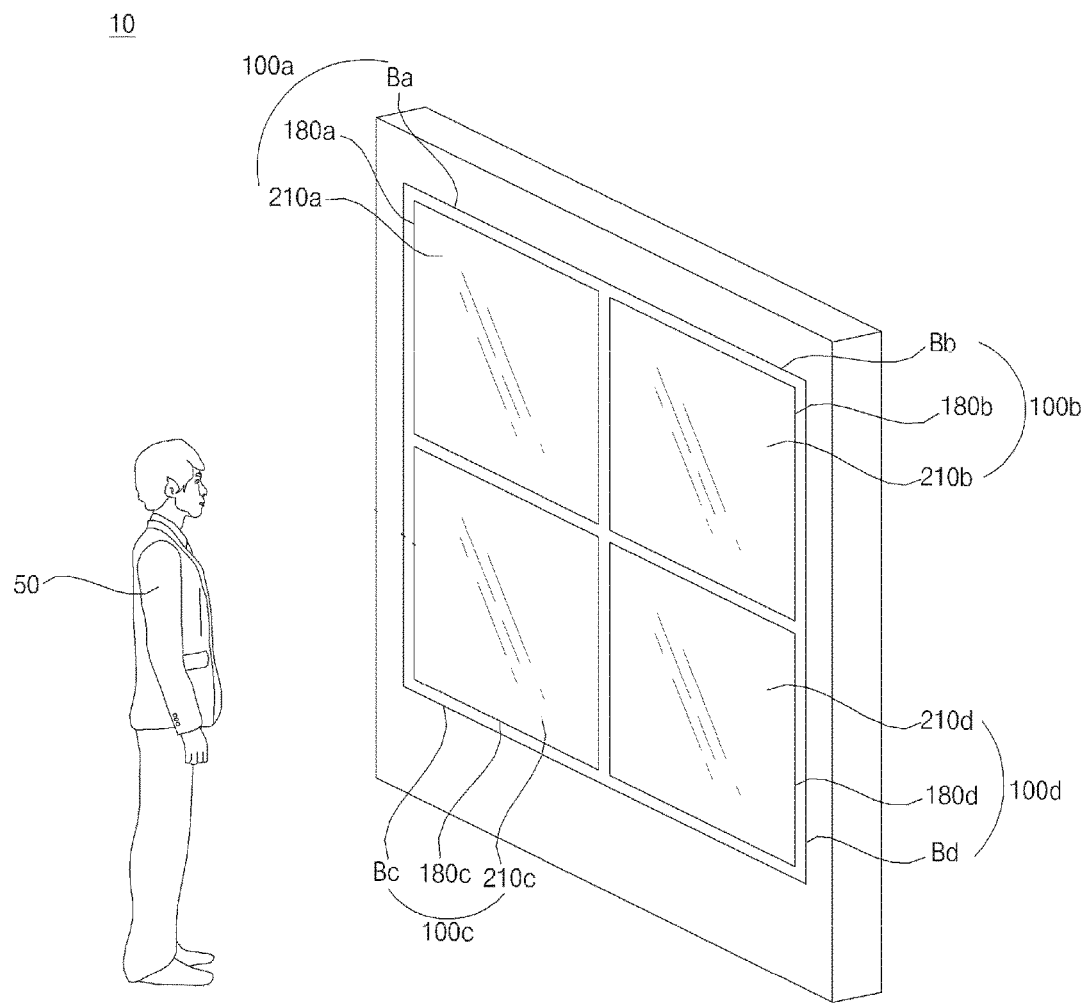
FIG. 1 is a view showing an appearance of a display apparatus according to an embodiment of the present invention.

FIG. 1 is a view showing an appearance of a display apparatus according to an embodiment of the present invention.

Referring to FIG. 1, a display apparatus 10 may be installed at an outdoor public place or the like.

For example, the display apparatus 10 may be installed in a public facility such as a car, a terminal, a train station, and an airport to provide information such as advertisements, news, and notices. The display apparatus 10 may also be arranged around a show window in a store such as a department store, a shopping mall, a large mart or the like to advertise a specific article.

The display apparatus 10 may include a plurality of displays 180a to 180d arranged adjacent to each other.

The plurality of displays 180a to 180d may include a plurality of panels 210a to 210d and bezels Ba to Bd surrounding the panels 210a to 210d.

In the figure, the display apparatus 10 includes a plurality of image display devices 100a to 100d including the plurality of displays 180a to 180d.

For example, in the display apparatus 10, an image distributed by an image distribution unit (not shown) may be input to controllers 170a to 170d provided in the plurality of image display devices 100a to 100d. The image signal-processed by the controllers 170a to 170d may be input to the respective displays 180a to 180d, and the respective displays 180a to 180d may display the image.

Thus, the user 50 may view an image displayed on the display apparatus 10, as shown in the figure. In particular, the image displayed on the plurality of displays 180a to 180d may be viewed.

As another example, the display apparatus 10 may include a controller 170 that commonly controls the plurality of image display devices 100a to 100d. Thereby, the controller 170 may perform signal processing of the displayed image. Then, the signal-processed image may be input to each of the displays 180a to 180d, and the displays 180a to 180d may display the image.

Meanwhile, in the peripheral areas formed on the plurality of displays 180a to 180d near the bezels Ba to Bd, brightness is lowered compared to the central areas of the displays 180a to 180d. In particular, when the plurality of displays 180a to 180d is arranged consecutively, decrease in brightness is pronounced.

In order to address this issue, the display apparatus 10 according to an embodiment of the present invention includes a plurality of displays 180a to 180d arranged adjacent to each other. The displays 180a to 180d include panels 210a to 210d, bezels Ba to Bd surrounding the panels 210a to 210d and a light source unit 252 having a plurality of light sources Leda to Ledn for outputting light to the panels 210a to 210d. A first current Ieg is applied to first light sources Leda and Ledb arranged in first areas EGa to EGd near the bezels Ba to Bd among the plurality of light sources Leda to Ledn, and a second current Ice smaller than the first current Ieg is applied to second light sources Ledc to Ledn arranged in second areas CEa to CEd in the first areas EGa to EGd. Thereby, decrease in brightness in the areas near the bezels may be compensated for, and uniform brightness may be implemented throughout the displays.

In other words, in the display apparatus 10 according to an embodiment of the present invention, the first current Ieg applied to the first light sources Leda and Ledb arranged in the first areas EGa to EGd, which surround the center areas of the panels 210a to 210d, may be set to be larger than the current applied to the second light sources Ledc to Ledn arranged in the second areas CEa to CEd, which are the center areas of the panels 210a to 210d.

Particularly, to display images with the same brightness in all areas of the panels 210a to 210d, the first current Ieg is applied to the first light sources Leda and Ledb arranged in the first areas Lga and Ldb of the displays 180a to 180d near the bezels Ba to Bd, and the second current Ice smaller than the first current Ieg is applied to the second light sources Ledc to Ledn arranged in the second areas CEa to CEd in the first areas EGa to EGd. Thereby, decrease in brightness in the areas near the bezels may be compensated for, and uniform brightness may be implemented throughout the displays.

Meanwhile, a third current Ipk larger than the first current Ieg is applied to third light sources Ledx in corner areas among the first areas EGa to EGd near the bezels Ba to Bd. Thereby, decrease in brightness in the areas near the bezels may be compensated for, and uniform brightness may be implemented throughout the displays.

The plurality of displays 180a to 180d includes a first display 180a and a second display 180b arranged on a first side of the first display 180a, and a fourth current smaller than the first current Ieg and larger than the second current Ice is applied to light sources arranged in a first side area of the first areas EGa to EGd which is adjacent to the second display 180b. Thereby, decrease in brightness in the areas near the bezels may be compensated for, and uniform brightness may be implemented throughout the displays.

While the displays 180a to 180d are illustrated in the figure as being arranged in a 2×2 array, they may be arranged in a 1×4 or 4×1 array. That is, when two or more displays are arranged consecutively, the current applied to the light sources in the second areas inside the first areas is preferably smaller than the current applied to the first areas near the bezels according to an embodiment of the present invention.

Hereinafter, the internal structure, operation and the like of the display apparatus 10 will be described in more detail with reference to FIGS. 2 to 4.

Figure 2:
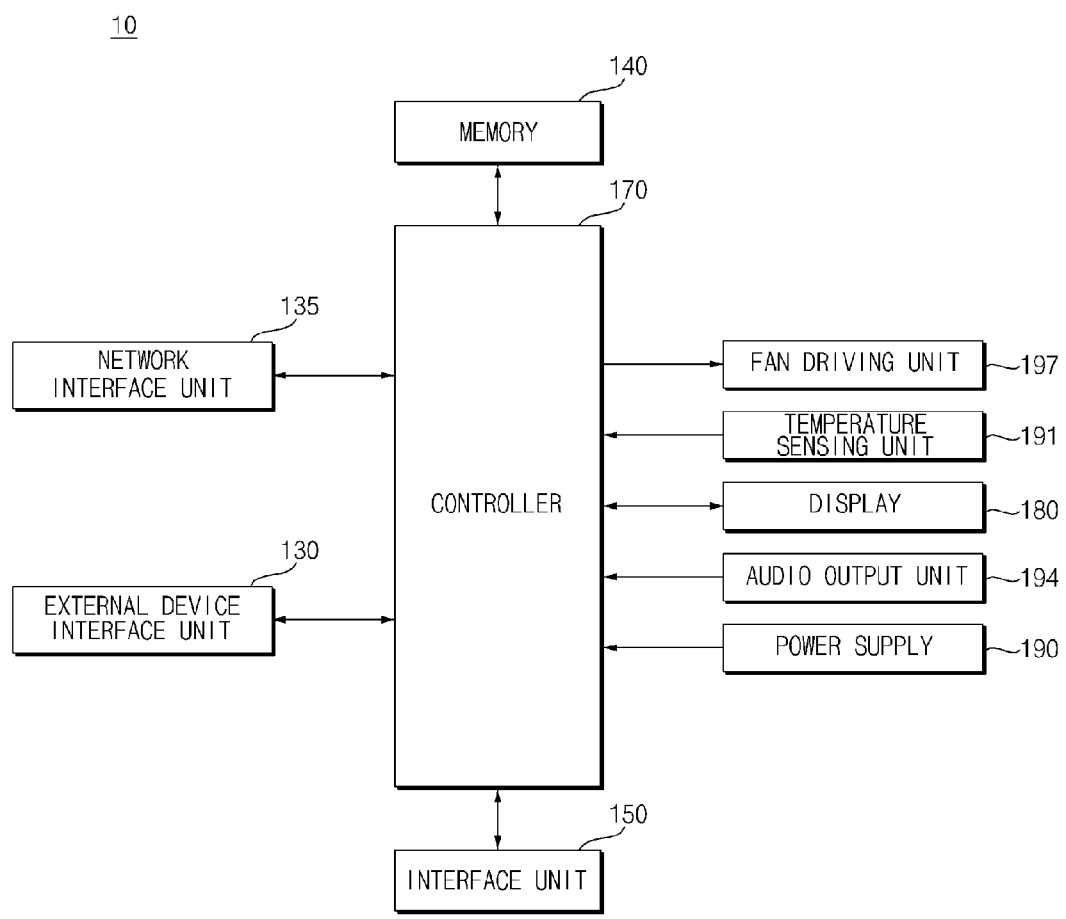
FIG. 2 is an exemplary internal block diagram illustrating an image display device of FIG. 1.

FIG. 2 is an exemplary internal block diagram illustrating the display apparatus of FIG. 1.

The display apparatus 10 of FIG. 1 may include a plurality of image display devices 100a to 100d.

The figure shows an internal block diagram of one image display device 100 of the plurality of image display devices 100a to 100d.

Referring to the figure, the image display apparatus 100 may include an external device interface unit 130, a network interface unit 135, a memory 140, a controller 170, a display 180, a power supply 190, an audio output unit 194, a temperature sensing unit 191, and a fan driving unit 197.

The external device interface unit 130 may transmit and receive data to and from an external device (not shown) connected thereto. To this end, the external device interface unit 130 may include an audio/video (A/V) input/output unit (not shown) or a data input/output unit (not shown).

For example, the external device interface unit 130 may include an HDMI terminal, an RGB terminal, a component terminal, a USB terminal, and a micro SD terminal.

The network interface unit 135 provides an interface for connecting the image display device 100 to a wired/wireless network including the Internet. For example, the network interface unit 135 may transmit and receive content or data provided by an Internet or content provider or a network operator over a network.

The memory 140 may store a program for processing and control of each signal in the controller 170 and may store signal-processed image, audio, or data signals.

In addition, the memory 140 may perform a function to temporarily store image, audio, or data signals input to the external device interface unit 130.

Meanwhile, the display 180 may include various display panels such as an LCD, an OLED, and a PDP, and may display a predetermined image through the display panel.

The user input interface unit 150 transmits a signal input by the user to the controller 170 or a signal from the controller 170 to the user.

To this end, the user input interface unit 150 may include a local key including a power key, and a touch panel allowing user information to be input therethrough.

The controller 170 may control overall operations of the image display device 100. Specifically, the controller 170 may control operation of each unit in the image display device 100.

The controller 170 may perform a control operation such that a video image stored in the memory 140 or a video image received from an external device through a network interface unit 135 is output as an output image.

In particular, the controller 170 may control the display 180 to output a predetermined image. Specifically, the R, G, and B signals corresponding to a video image to be displayed may be output to the display 180. Thereby, the display 180 may display the predetermined image.

The power supply 190 may receive external power or internal power under control of the controller 170 and supply power necessary for operation of the respective components.

The power supply 190 supplies the corresponding power throughout the image display device 100. In particular, the power supply may supply power to the controller 170, which may be implemented in the form of a system on chip (SOC), the display 180 for displaying images, and the audio output unit 194 for audio output.

The temperature sensing unit 191 may sense the temperature of the periphery of the display 180.

The temperature sensed by the temperature sensing unit 191 may be input to the controller 170, and the controller 170 may control the operation of the fan driving unit 197 based on the sensed temperature.

For example, the controller 170 may control the fan driving unit 197 to operate when the sensed temperature is higher than or equal to a reference temperature. Accordingly, the fan driving unit 197 may drive at least one fan module (not shown) disposed in the display apparatus 10.

Figure 4:
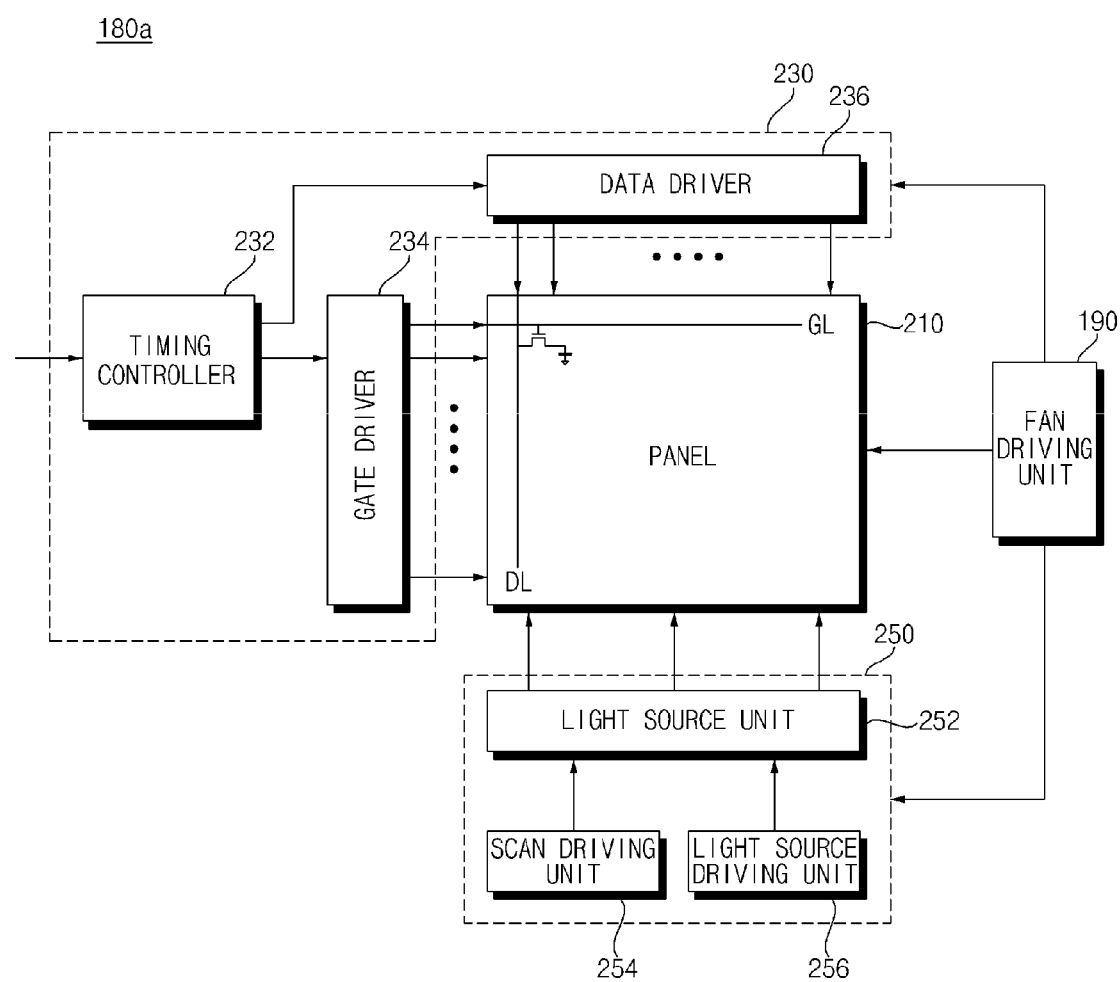
FIG. 4 is an exemplary internal block diagram illustrating the display of FIG. 1 or 2.

FIG. 4 is an exemplary internal block diagram illustrating the display of FIG. 1 or 2.

Referring to the figure, the display 180, which is based on a liquid crystal display (LCD) panel, may include an LCD panel 210, a driver circuit unit 230, and a backlight unit 250.

To display images, the LCD panel 210 includes a first substrate on which a plurality of gate lines GL and data lines DL are arranged to intersect each other in a matrix form, and a thin film transistor and a pixel electrode connected thereto are formed in the areas of intersection, a second substrate including a common electrode, and a liquid crystal layer formed between the first substrate and the second substrate.

The driver circuit unit 230 drives the LCD panel 210 through a control signal and a data signal supplied from the controller 170 of FIG. 1. To this end, the driver circuit unit 230 includes a timing controller 232, a gate driver 234, and a data driver 236.

The timing controller 232 receives a control signal, R, G, and B data signals and a vertical synchronization signal Vsync input from the controller 170. The timing controller 232 controls the gate driver 234 and the data driver 236 according to the control signal, rearranges the R, G, and B data signals, and provides the rearranged R, G, and B data signals to the data driver 236.

A scanning signal and an image signal are supplied to the LCD panel 210 through the gate lines GL and the data lines DL under control of the gate driver 234, the data driver 236 and the timing controller 232.

The backlight unit 250 supplies light to the LCD panel 210. To this end, the backlight unit 250 includes a light source unit 252 including a plurality of light sources, a scan driving unit 254 for controlling the scanning operation of the light source unit 252, and a light source driving unit 256 for turning on/off the light source unit 252.

A predetermined image is displayed using the light emitted from the backlight unit 250 with the light transmittance of the liquid crystal layer adjusted by the electric field formed between the pixel electrode and the common electrode of the LCD panel 210.

The power supply 190 supplies a common electrode voltage Vcom to the LCD panel 210 and supplies a gamma voltage to the data driver 236. In addition, the power supply 190 may supply the backlight unit 250 with driving power for driving the light source 252.

Figure 5A:
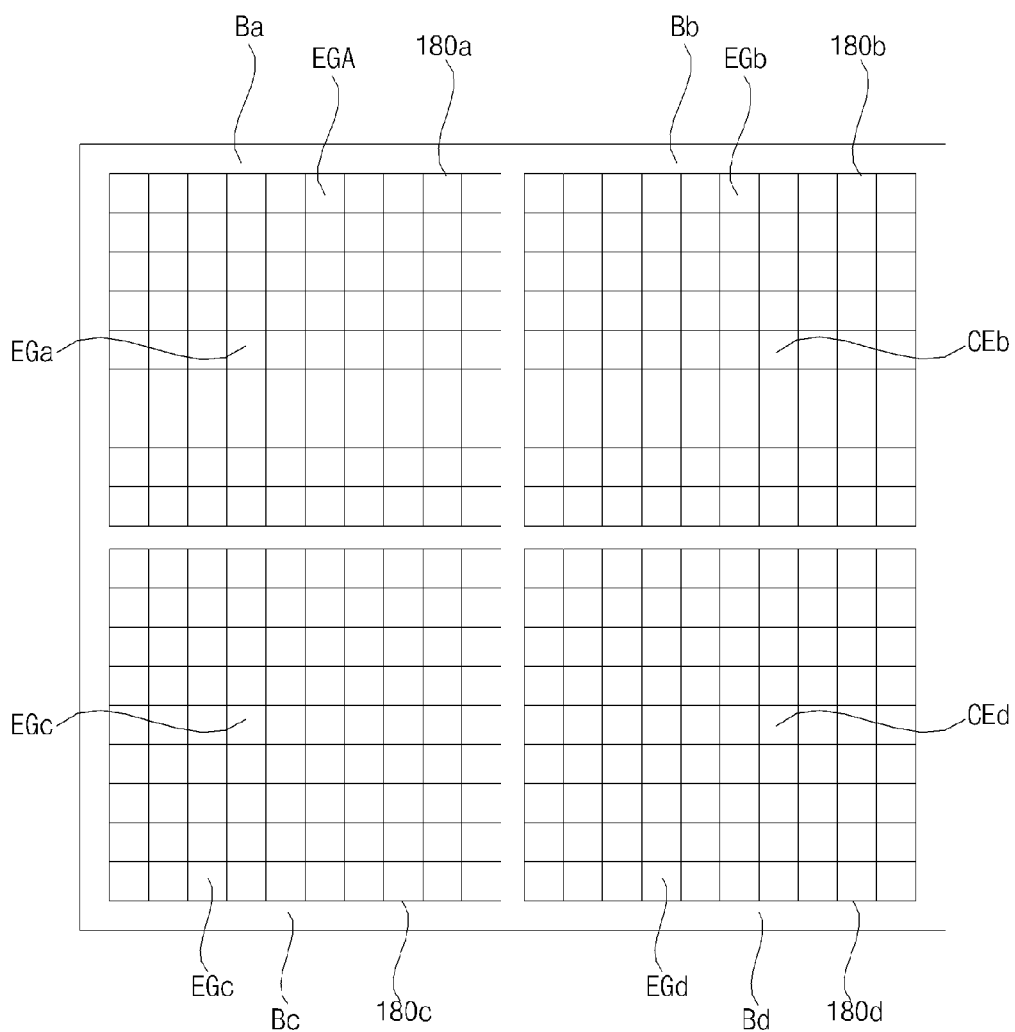
FIGS. 5A to 5C illustrate operation of the display apparatus of FIG. 1.
Figure 5B:
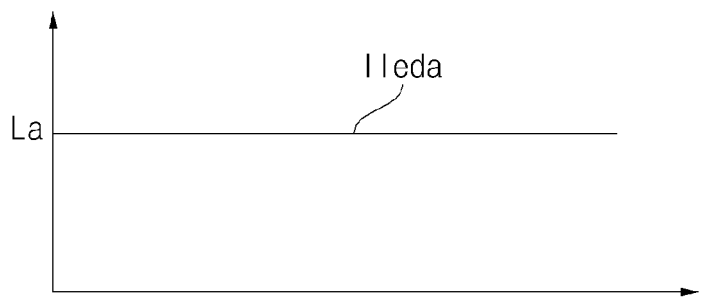
Figure 5C:
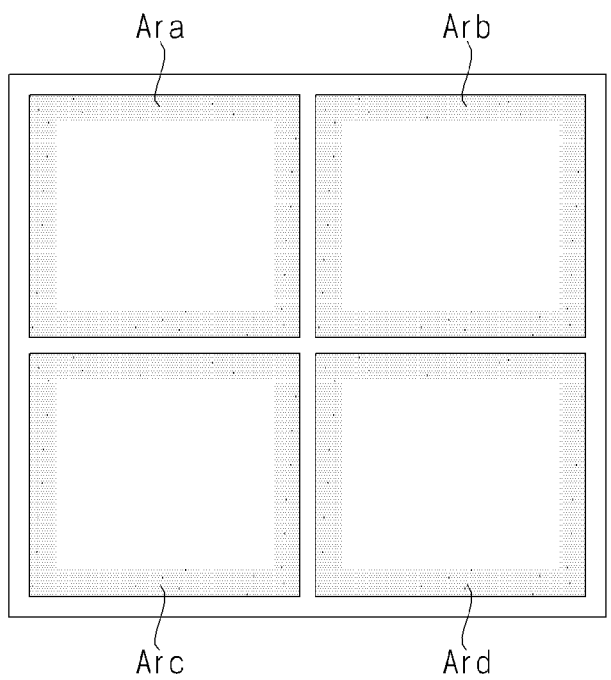

FIGS. 5A to 5C illustrate operation of the display apparatus of FIG. 1.

FIG. 5A illustrates arrangement of a plurality of displays 180a to 180d in a 2×2 array.

Referring to the figure, the plurality of displays 180a to 180d may each include a first area EGa to EGd near the bezels Ba to Bd and a second area CEa to CEd, which is the center area inside the first area EGa to EGd.

FIG. 5B illustrates application of currents Ileda and Iledb to a plurality of light sources arranged in the first areas EGa to EGd and the second areas CEa to CEd.

For example, a current Ileda flows through the first areas EGa to EGd and a current Iledb flows through the second areas CEa to CEd.

When each of the plurality of displays 180a to 180d displays images with the same brightness, the currents Ileda and Iledb may remain constant at current level La as shown in the figure.

However, when the currents Ileda and Iledb at the same level are applied to the plurality of light sources arranged in the first areas EGa to EGd and the second areas CEa to CEd, light is not uniformly transmitted to the first areas EGa to EGd near the bezels Ba to Bd due to the bezels Ba to Bd surrounding the displays 180a to 180d. Thereby, as shown in FIG. 5C, brightness is lowered in the first areas EGa to EGd near the bezels.

Such decrease in brightness in the edge areas becomes more pronounced when the plurality of displays 180a to 180d is arranged consecutively.

In order to address this issue, the level of the current applied to the first areas is set to be higher than the level of the current applied to the second areas. Details will be described with reference to FIG. 6A below.

FIGS. 6A to 8B illustrate operation of a display apparatus according to an embodiment of the present invention.

Figure 6A:
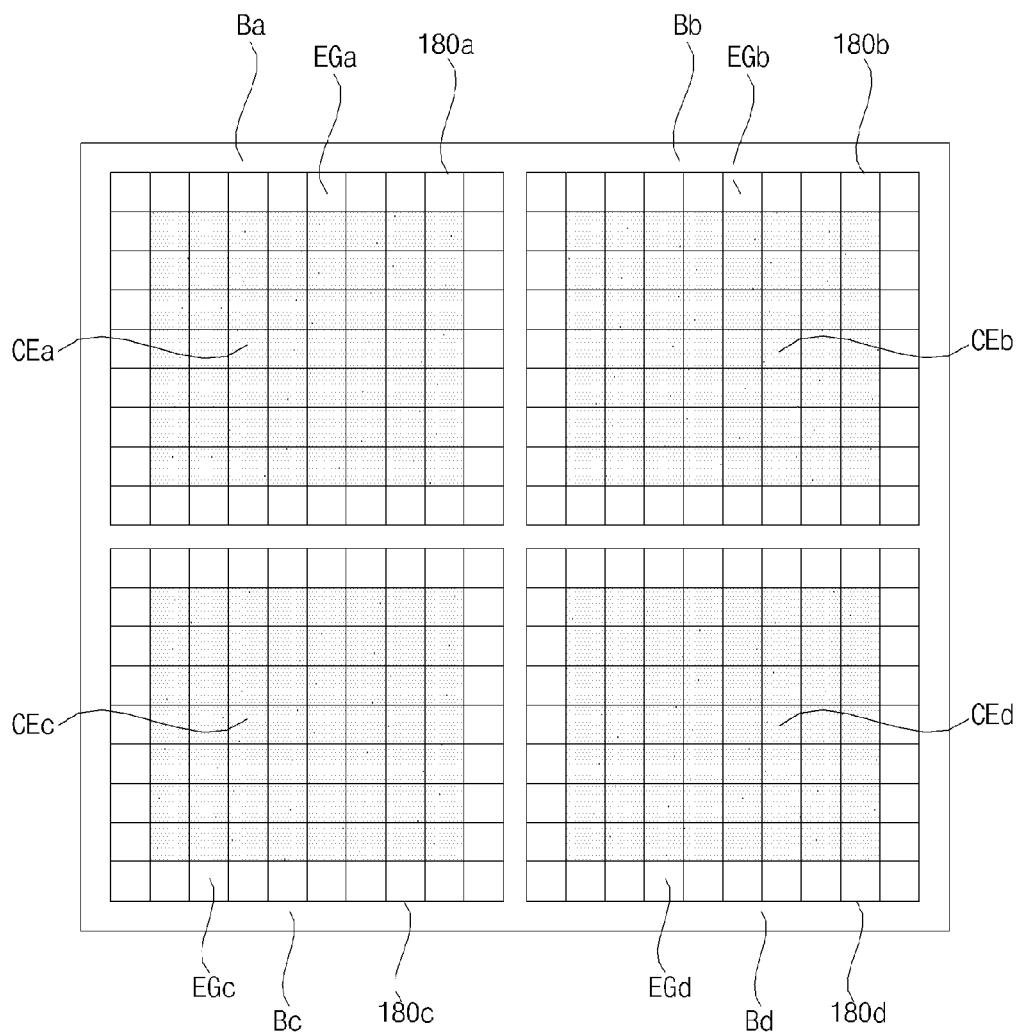
FIGS. 6A to 8B illustrate operation of a display apparatus according to an embodiment of the present invention.

First, FIG. 6A illustrates arrangement of a plurality of displays 180a to 180d in a 2×2 array.

Referring to the figure, the plurality of displays 180a to 180d each may include a first area EGa to EGd near the bezels Ba to Bd and a second area CEa to CEd, which is the center area in the first area EGa to EGd.

Figure 6B:
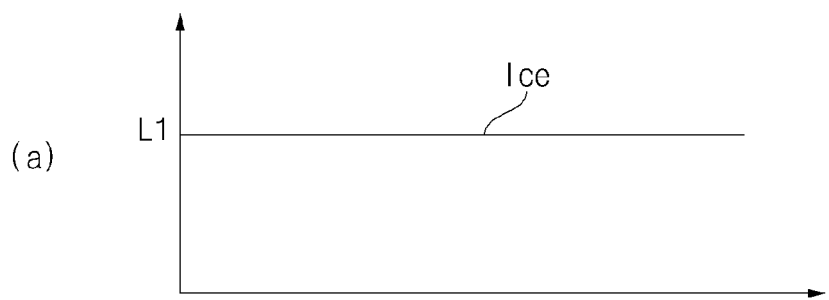
Figure 6B:
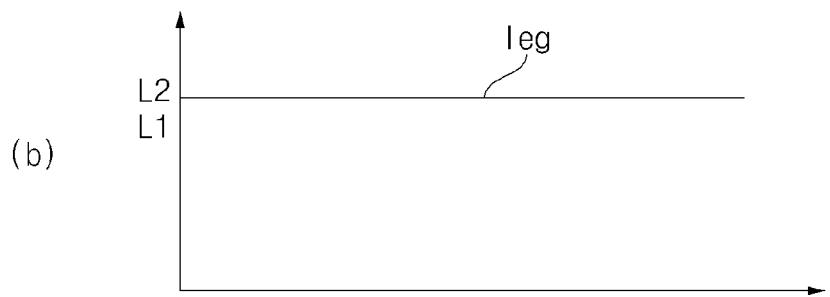

FIG. 6B illustrates application of a first current Ieg and a second current Ice to a plurality of light sources arranged in the first areas EGa to EGd and the second areas CEa to CEd.

For example, the first current Ieg flows through the first areas EGa to EGd and the second current Ice flows through the second areas CEa to CEd.

Preferably, when the plurality of displays 180a to 180d displays images with the same brightness, the current level of the first current Ieg is a first level L1, and the current level is a second level L2 lower than the first level L1, as shown in the figure.

For example, the second level L2 may be a current level corresponding to a brightness level of 230 among brightness levels between 0 and 255, and the first level L1 may be a current level corresponding to the brightness level of 250 among the brightness levels between 0 and 255. The first level L1 may be about 10% higher than the second level L2.

Figure 6C:
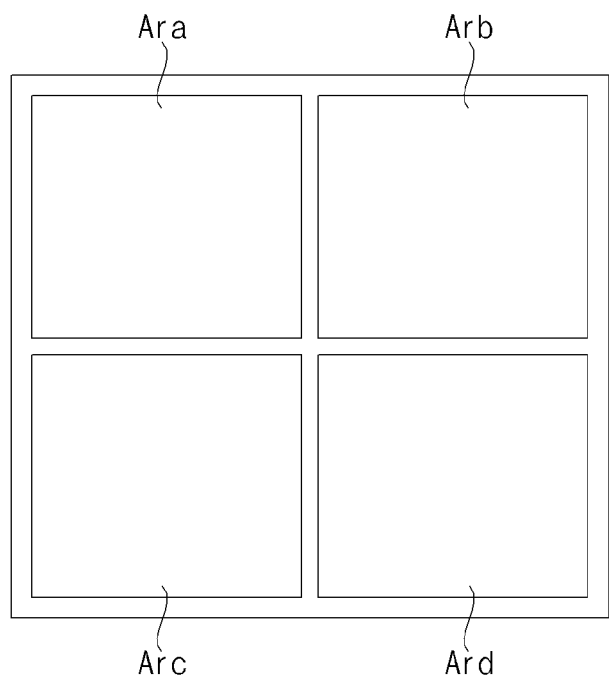

As described above, the first current Ieg of the first level L1 is applied to the first light sources arranged in the first areas EGa to EGd, and the second current Ice of the second level L2 is applied to the second light sources arranged in the second areas CEa to CEd. Thereby, light is further transmitted to the first areas EGa to EGd near the bezels as shown in FIG. 6C. As a result, light of uniform brightness is output throughout the panel.

Therefore, decrease in brightness as shown in FIG. 5C is attenuated.

Figure 3:
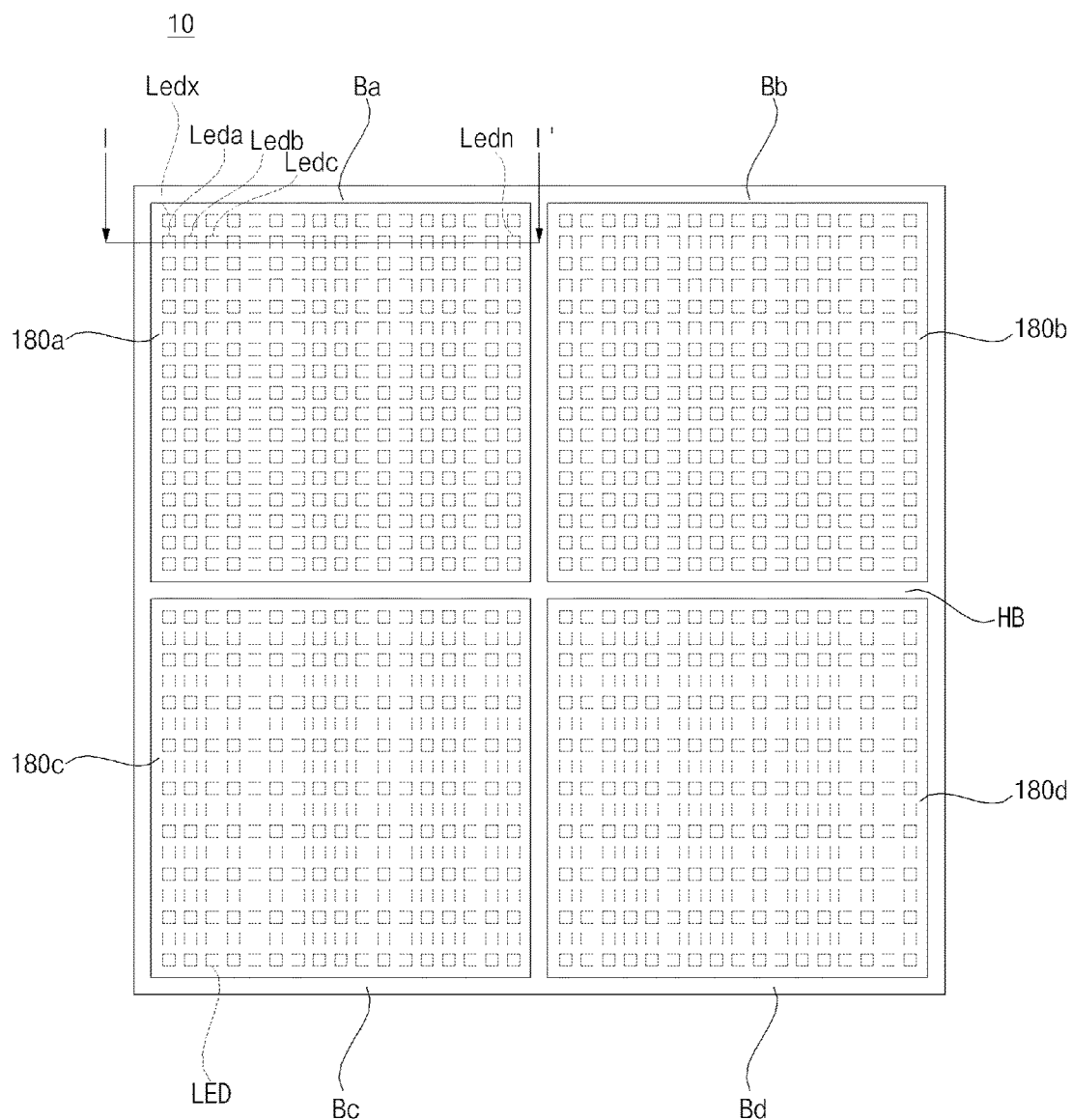
FIG. 3 is a view showing a plurality of light sources arranged inside the display apparatus of FIG. 1.
Figure 7A:
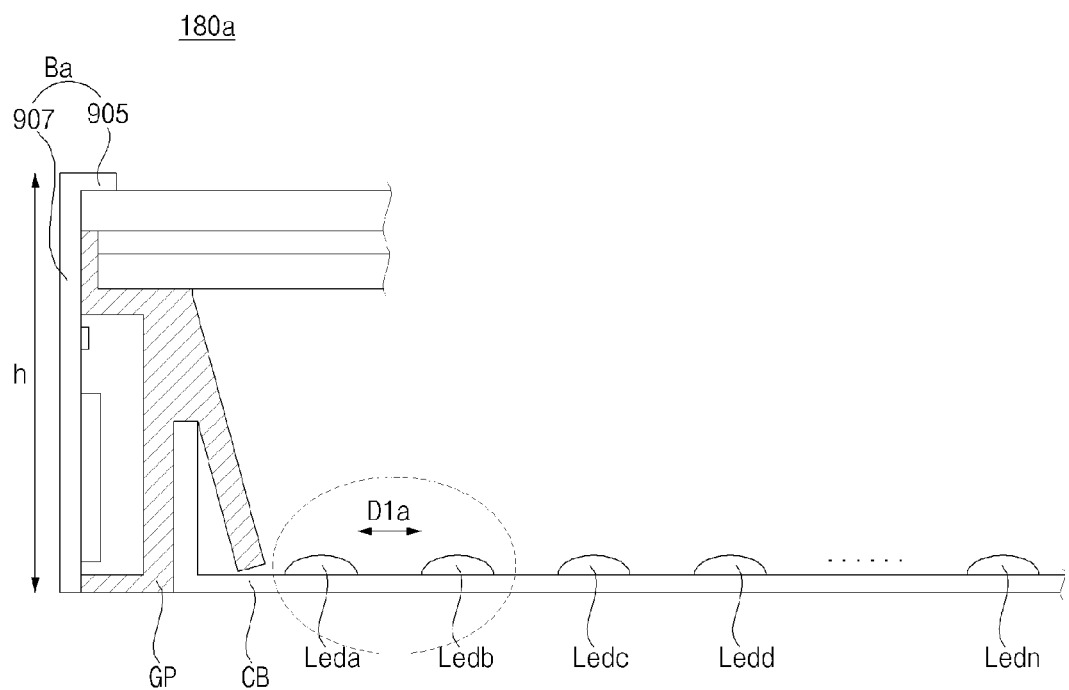

FIG. 7A shows a side view of the first display 180a in the display apparatus of FIG. 3 by cutting the first display 180a along line I-I'.

Referring to the figure, the first display 180a includes a plurality of light sources Leda to Ledn disposed on a cover bottom CB, a guide panel GP formed on a side of the plurality of light sources Leda to Ledn, a diffusion sheet 910 formed on the guide panel GP and the plurality of light sources Leda to Ledn to diffuse light from the plurality of light sources Leda to Ledn, a panel 210 disposed on the diffusion sheet 910, and a bezel Ba formed at an upper portion of one end of the panel 210 to fix the panel 210.

The bezel Ba may enclose the plurality of light sources Leda to Ledn.

The bezel Ba may include a first portion 905 for fixing the panel 210 and a second portion 907 extending to the panel 210 or the plurality of light sources Leda to Ledn and intersecting the first portion 905.

As described above, the light output from a first light source Leda and a second light source Ledb among the plurality of light sources Leda to Ledn is different from the light output from the other light sources Ledc and Ledn in that transmission of the light is restricted due to the guide panel GP or the bezel Ba.

Therefore, as described with reference to FIGS. 5A to 5C, brightness may be lowered in the area near the bezel Ba.

To address this issue, in the present invention, a first current Ieg is applied to the first light sources Leda and Ledb arranged in the first areas EGa to EGd near the bezels Ba to Bd among the plurality of light sources, and a second current Ice smaller than the first current Ieg is applied to the second light sources Ledc to Ledn arranged in the second areas CEa to CEd in the first areas EGa to EGd.

For example, the light source driving unit 256 of FIG. 4 may perform a control operation such that the first current Ieg is applied to the first light sources Leda and Ledb arranged in the first areas EGa to EGd near the bezels Ba to Bd among the plurality of light sources Leda to Ledn, and the second current Ice smaller than the first current Ieg is applied to the second light sources Ledc to Ledn arranged in the second areas CEa to CEd in the first areas EGa to EGd.

Alternatively, the controller 170 of FIG. 2 may perform a control operation such that the first current Ieg is applied to the first light sources Leda and Ledb arranged in the first areas EGa to EGd near the bezels Ba to Bd among the plurality of light sources Leda to Ledn and the second current Ice smaller than the first current Ieg is applied to the second light sources Ledc to Ledn arranged in the second areas CEa to CEd in the first areas EGa to EGd.

Figure 7B:
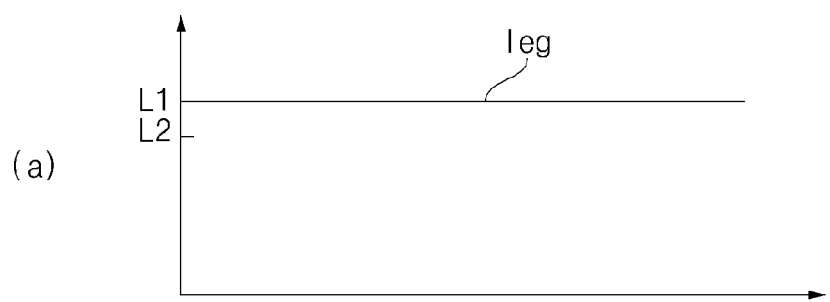
Figure 7B:
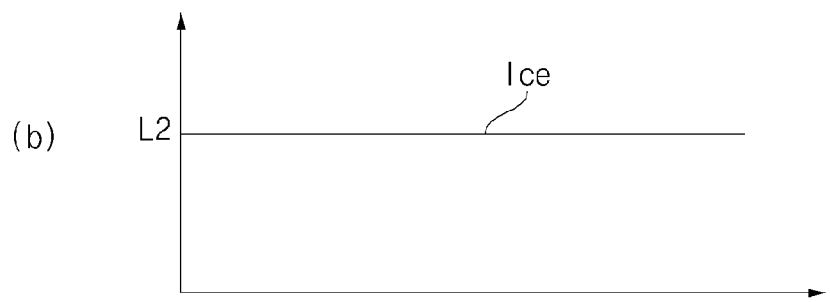

FIG. 7B illustrates application of a first current Ieg and the second current Ice to each of the plurality of light sources arranged in the first areas EGa to EGd and the second areas CEa to CEd.

As an example, the first current Ieg flows through the first areas EGa to EGd and the second current Ice flows through the second areas CEa to CEd.

Preferably, when the plurality of displays 180a to 180d displays images with the same brightness, the current level of the first current Ieg is a first level L1, and the current level of the second current Ice is a second level L2 lower than the first level L1, as shown in the figure.

To this end, when the plurality of displays 180a to 180d displays images with the same brightness, the controller 170 or the light source driving unit 256 may perform a control operation such that the current level of the first current Ieg is set to the first level L1 and the current level of the second current Ice is set to the second level L2 lower than the first level L1, as shown in the figure.

Thereby, light is further transmitted to the first areas EGa to EGd near the bezels. As a result, light of uniform brightness is output throughout the panel.

The controller 170 or the light source driving unit 256 may perform a control operation such that the level of the first current Ieg applied to the first areas EGa to EGd and the level of the second current Ice applied to the second areas CEa to CEd are increased as the height h between the plurality of light sources Leda to Ledn and the panel 210 increases.

Figure 7C:
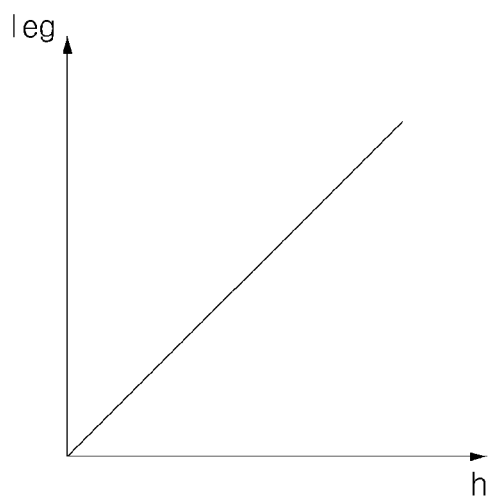
Figure 7D:
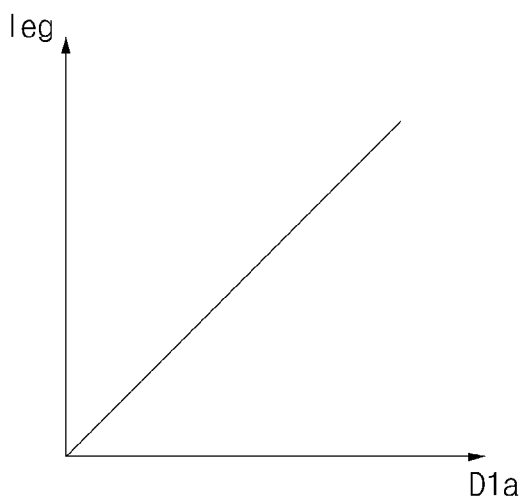

As the height h between the plurality of light sources Leda to Ledn and the panel 210 increases, the light reaching the panel 210 from the plurality of light sources Leda to Ledn decreases, and accordingly the level of the first current Ieg applied to the first areas EGa to EGd is, as shown in FIG. 7C, preferably increased. At this time, the level of the second current Ice in the second areas CEa to CEd is also preferably increased.

Meanwhile, as the gap D1a between the plurality of light sources Leda to Ledn increases, a level of the first current Ieg preferably increases.

Meanwhile, as the gap D1a between the plurality of light sources Leda to Ledn increases, the difference in level between the first current Ieg and the second current Ice preferably increases.

To this end, the controller 170 or the light source driving unit 256 may perform a control operation such that the difference in level between the first current Ieg and the second current Ice increases as the gap between the plurality of light sources Leda to Ledn increases.

Figure 8A:
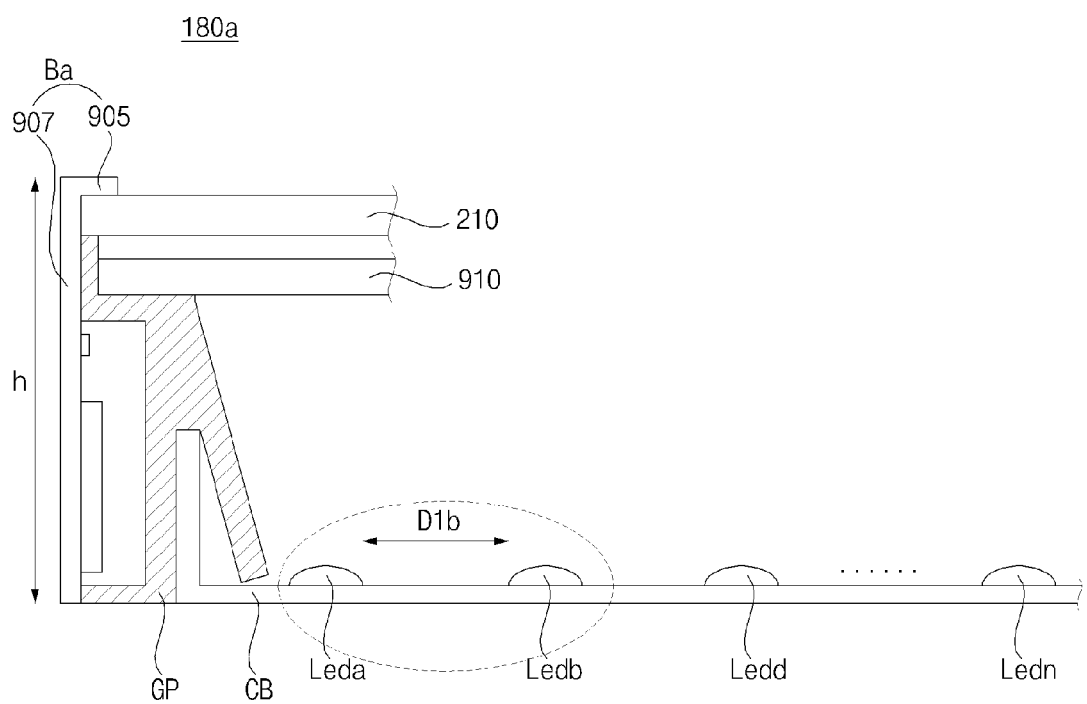

Similar to FIG. 7A, FIG. 8A shows another side view of the first display 180a in the display apparatus of FIG. 3 formed by cutting the first display 180a along line I-I'.

Referring to the figure, the first display 180a includes a plurality of light sources Leda to Ledn, a guide panel GP formed on a side of the plurality of light sources Leda to Ledn, a diffusion sheet 910 formed on the guide panel GP and the plurality of light sources Leda to Ledn to diffuse light from the plurality of light sources Leda to Ledn, a panel 210 arranged on the diffusion sheet 910, and a bezel Ba formed at an upper portion of one end of the panel 210 to fix the panel 210.

FIG. 8A is different from FIG. 7A in that the gap D1b between the light sources Leda to Ledn of FIG. 8A is larger than the gap D1a in FIG. 7A.

As the distance D1b between the light sources Leda to Ledn increases as shown in FIG. 8A, the light reaching the panel 210 in the vicinity of the bezel area is reduced. Accordingly, the level of the first current Ieg applied to the light sources corresponding to the first areas EGa to EGd is preferably set to be higher than in the example of FIG. 7B.

In addition, the level of the second current Ice applied to the light sources corresponding to the second areas Cea to Ced is preferably set to be higher than in the example of FIG. 7B.

Figure 8B:
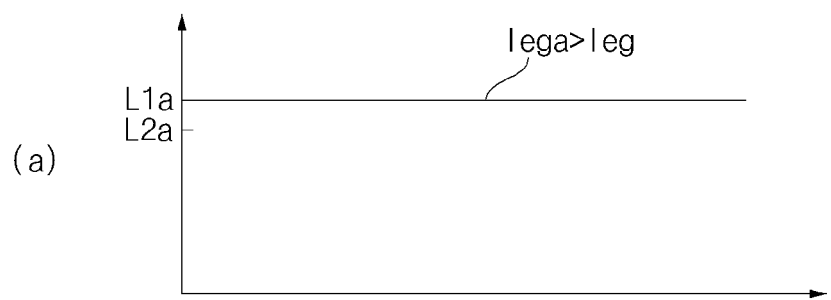
Figure 8B:
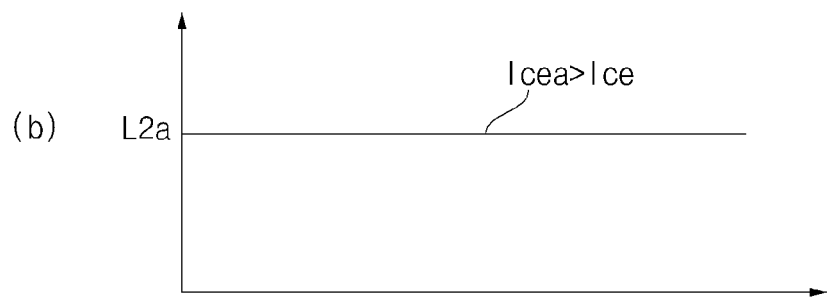

FIG. 8B illustrates application of a first current Iega and a second current Icea to each of the plurality of light sources arranged in the first areas EGa to EGd and second areas CEa to CEd.

The controller 170 or the light source driver 256 may perform a control operation such that the current level of the first current Iega is set to a first level L1a and the current level of a second current Icea is set to a second level L2a lower than the first level L1a.

Preferably, when the plurality of displays 180a to 180d displays images with the same brightness, the current level of the first current Iega is the first level L1a, and the current level of the second current Icea is the second level L2a lower than the first level L1a, as shown in the figure.

The controller 170 or the light source driving unit 256 may perform a control operation such that the first level L1a of FIG. 8B is higher than the first level L1 of FIG. 7B and the second level L2a of FIG. 8B is higher than the second level L2a of FIG. 7B.

Particularly, the first level L1a of FIG. 8B is preferably higher than the first level L1 of FIG. 7B and the second level L2a of FIG. 8B is preferably higher than the second level L2a of FIG. 7B.

Accordingly, light is further transmitted to the first areas EGa to EGd near the bezel. As a result, light of uniform brightness is output throughout the panel.

Figure 9A:
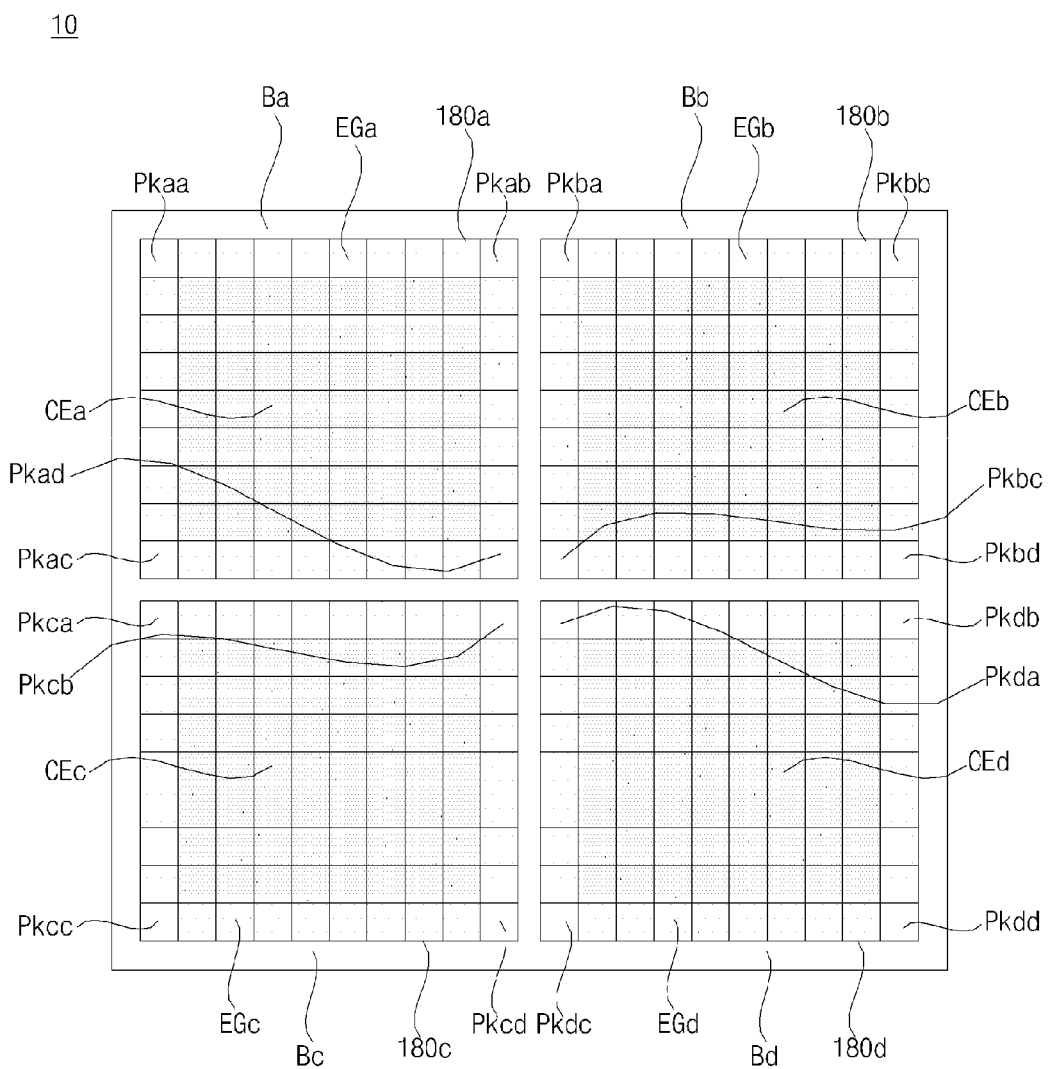
FIGS. 9A to 9C illustrate operation of a display apparatus according to another embodiment of the present invention.
Figure 9B:
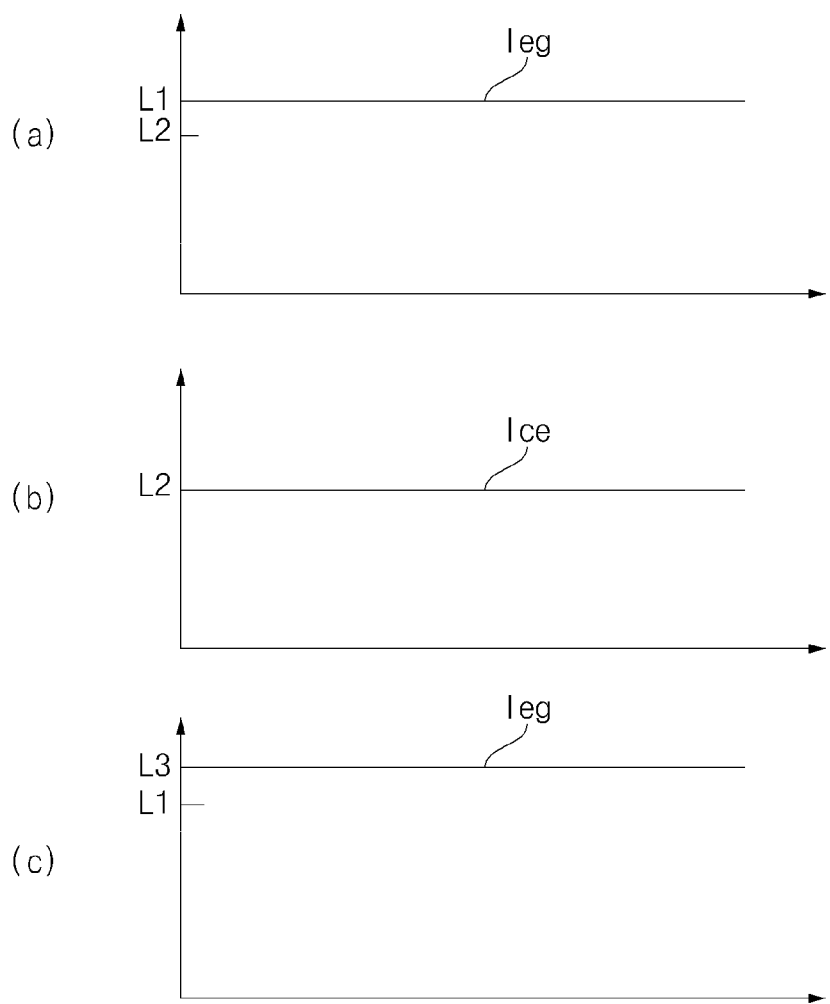
Figure 9C:
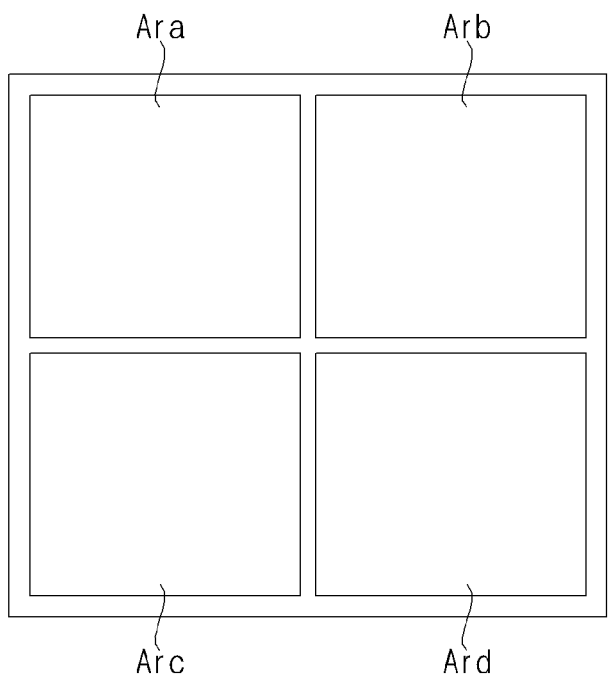

FIGS. 9A to 9C illustrate operation of a display apparatus according to another embodiment of the present invention.

First, FIG. 9A illustrates arrangement of a plurality of displays 180a to 180d in a 2×2 array.

According to the figure, the plurality of displays 180a to 180d may each include a first area EGa to EGd near the bezels Ba to Bd and a second area CEa to CEd, which is the center area in the first areas EGa to EGd.

FIG. 9B illustrates application of a first current Ieg and a second current Ice to a plurality of light sources arranged in the first areas EGa to EGd and the second areas CEa to CEd.

For example, a third current Ipk larger than the first current Ieg is applied to a third light source Ledx arranged in the corner area among the first areas EGa to EGd near the bezels Ba to Bd.

The controller 170 or the light source driver 256 may perform a control operation such that the third current Ipk larger than the first current Ieg is applied to the third light source Ledx arranged in the corner area among the first areas EGa to EGd near the bezels Ba to Bd.

Each of the displays 180a to 180d is provided with four corner areas Pkaa to Pkad, Pkba to Pkbd, Pkca to Pkcd, and Pkda to Pkdd at the intersections of two bezels. Therefore, as the third current Ipk larger than the first current Ieg is applied to the third light sources Ledx formed at the corresponding positions, brightness may be prevented from being lowered in the corner areas in which two bezels intersect with each other.

As described above, the first current Ieg of the first level L1 is applied to the first light sources arranged in the first areas EGa to EGd, the second current of the second level L2 is applied to the second light sources arranged in the second areas CEa to CEd, and the third current Ipk larger than the first current Ieg is applied to the third light sources Ledx arranged in the corner areas among the first areas EGa to EGd near the bezels Ba to Bd. Thereby, light is further transmitted to the first areas EGa to EGd near the bezel as shown in FIG. 9C. As a result, light of uniform brightness is output throughout the panels 180a to 180d.

Therefore, decrease in brightness as shown in FIG. 5C is attenuated.

Figure 10A:
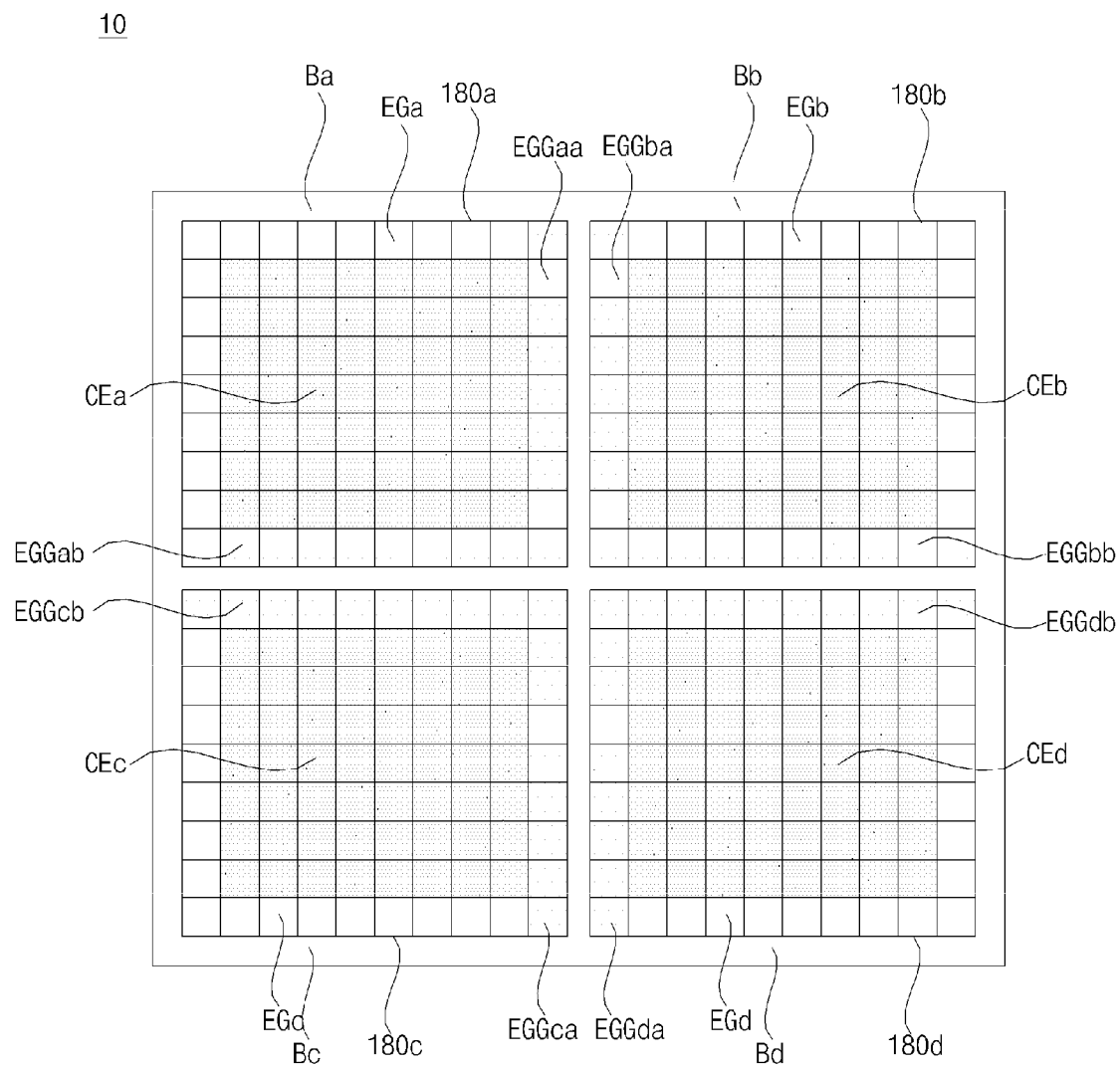
FIGS. 10A to 10C illustrate operation of a display apparatus according to another embodiment of the present invention.
Figure 10B:
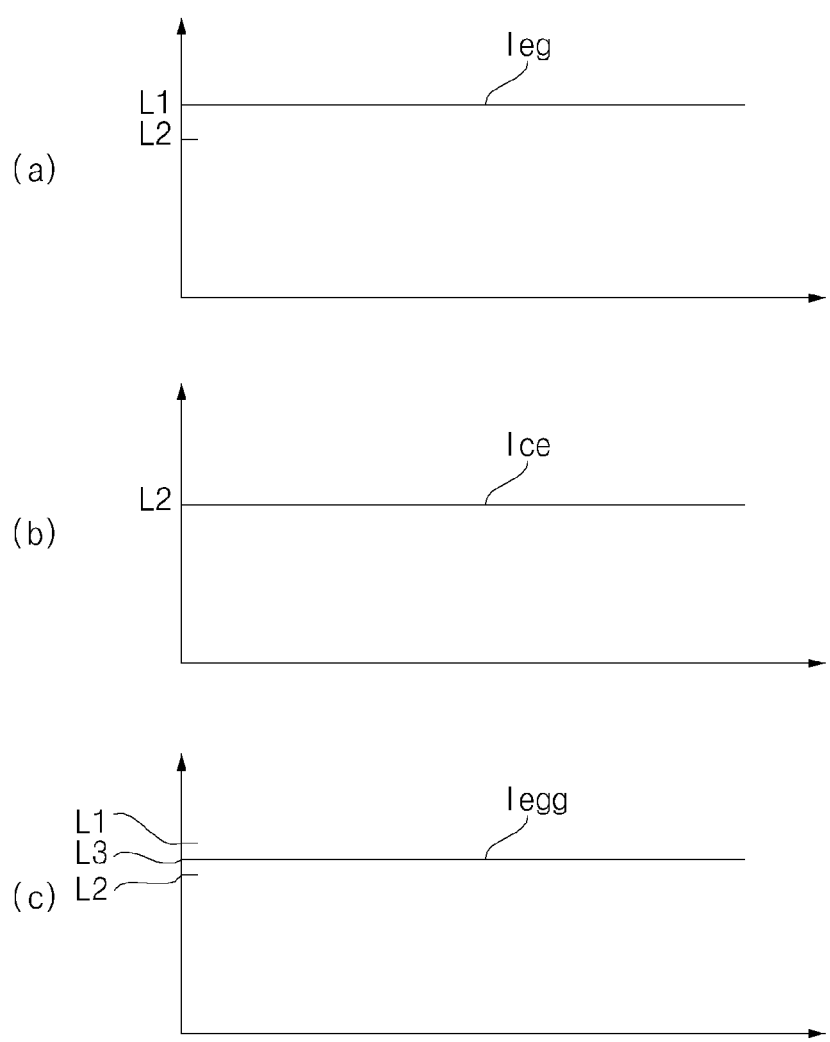
Figure 10C:
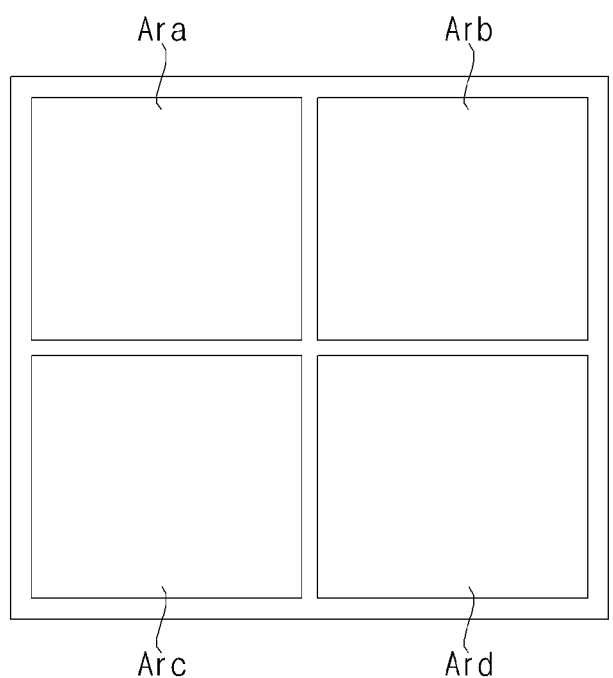

FIGS. 10A to 10C illustrate operation of a display apparatus according to another embodiment of the present invention.

First, FIG. 10A illustrates arrangement of a plurality of displays 180a to 180d in a 2×2 array.

Referring to the figure, the plurality of displays 180a to 180d may each include a first area EGa to EGd near the bezels Ba to Bd and a second area CEa to CEd, which is the center area in the first area EGa to EGd.

Decrease in brightness may be more pronounced in a second side area opposite to a first side area EGGaa, which is adjacent to the second display 180b among the first areas EGa to EGd of the first display 180a.

The controller 170 or the light source driving unit 256 may perform a control operation such that a fourth current Iegg smaller than the first current Ieg and larger than the second current Ice is applied to a light source arranged in the first side area EGGaa adjacent to the second display 180b among the first areas EGa to EGd of the first display 180a.

Thereby, the fourth current Iegg smaller than the first current Ieg and larger than the second current Ice may be applied to the light source arranged in the first side area adjacent to the second display 180b among the first areas EGa to EGd of the first display 180a.

FIG. 10B illustrates application of the first current Ieg and the second current Ice to a plurality of light sources arranged in the first areas EGa to EGd and the second areas CEa to CEd.

The controller 170 or the light source driving unit 256 may perform a control operation such that the fourth current Iegg smaller than the first current Ieg and larger than the second current Ice is applied to an area in which displays adjacent to each other are arranged in the first areas.

Each of the displays 180a to 180d has two areas EGGaa and EGGab, EGGba and EGGbb, EGGca and EGGcb, and EGGda and EGGdb, as shown in FIG. 10A, in which displays adjacent to each other are arranged in the first areas. Therefore, as the fourth current Iegg smaller than the first current Ieg and larger than the second current Ice is applied to the light sources formed at the corresponding positions, images having a uniform brightness may be displayed throughout the panels 180a to 180d as shown in FIG. 10C.

The display apparatus according to embodiments of the present invention is not limited to the configuration and method of the embodiments described above, and all or some of the embodiments described above may be selectively combined such that various modifications can be made.

As is apparent from the above description, a display apparatus according to an embodiment of the present invention includes a plurality of displays arranged adjacent to each other. Each of the displays includes a panel, a bezel surrounding the panel, and a light source unit including a plurality of light sources configured to output light to the panel. A first current is applied to a first light source arranged in a first area around the bezel of the display among the light sources, and a second current is applied to a second light source arranged in a second area in the first area among the light sources. Thereby, decrease in brightness of the peripheral area of the bezel may be compensated for, and uniform brightness may be obtained throughout the display.

Meanwhile, a third current larger than the first current is applied to a third light source in a corner area of the first area around the bezel. Thereby, decrease in brightness of the peripheral area of the bezel may be compensated for, and uniform brightness may be obtained throughout the display.

The plurality of displays includes a first display and a second display arranged on a first side of the first display, wherein a fourth current smaller than the first current and larger than the second current is applied to a light source arranged in a first side area adjacent to the second in a first area of the first display. Thereby, decrease in brightness of the peripheral area of the bezel may be compensated for, and uniform brightness may be obtained throughout the display.

As the height between the plurality of light sources and the panel increases, the difference in level between the first current and the second current increases. Thereby, decrease in brightness of the peripheral area of the bezel may be compensated for, and uniform brightness may be obtained throughout the display.

As the gap between the plurality of light sources increases, the difference in level between the first current and the second current increases. Thereby, decrease in brightness of the peripheral area of the bezel may be compensated for, and uniform brightness may be obtained throughout the display.

According to another embodiment of the present invention, a display device includes a plurality of displays arranged adjacent to each other. Each of the displays includes a plurality of light sources, a bezel surrounding the plurality of light sources, and a light source driving unit configured to drive the plurality of light sources. The light source driving unit performs a control operation such that a first current is applied to a first light source arranged in a first area around the bezel among the plurality of light sources and a second current smaller than the first current is applied to a second light source arranged in a second area in the first area. Thereby, decrease in brightness of the peripheral area of the bezel may be compensated for, and uniform brightness may be obtained throughout the display.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A display apparatus comprising:
a plurality of displays adjacently arranged, wherein each of the plurality of displays comprises:
a panel;
a bezel surrounding the panel;
a plurality of light sources disposed on a circuit board and configured to output light to the panel;
a guide panel disposed at a side of the circuit board; and
a diffusion sheet supported by the guide panel and disposed over the plurality of light sources,
wherein the panel is disposed over the diffusion sheet,
wherein the plurality of light sources comprises a first light source disposed at a first area of the circuit board and a second light source disposed at a second area of the circuit board, wherein the first area is adjacent to the bezel, and
wherein a first current is provided to the first light source and a second current is provided to the second light source and the second current is smaller than the first current.

2. The display apparatus according to claim 1, wherein a same level of display brightness is achieved across a displayed image at the panel when the first current is provided to the first light source and the second current is provided to the second light source.

3. The display apparatus according to claim 1, wherein the plurality of light sources further comprises a third light source disposed at a third area of the circuit board adjacent to a corner of the bezel,
wherein a third current larger than the first current is provided to the third light source.

4. The display apparatus according to claim 1, wherein the plurality of displays comprises a first display adjacent to a second display,
wherein the plurality of light sources further comprises a third light source disposed at a region of the first area adjacent to the second display, and
wherein a third current provided to the third light source is smaller than the first current and larger than the second current.

5. The display apparatus according to claim 1, wherein an upper surface at an end of the panel is secured by the bezel.

6. The display apparatus according to claim 1, wherein a level of the first current is determined based on a distance between the plurality of light sources and the panel.

7. The display apparatus according to claim 1, wherein a difference between the first current and the second current is determined based on a distance between the first light source and the second light source.

8. The display apparatus according to claim 1, further comprising a plurality of controllers configured to output a corresponding image signal to each of the plurality of displays.

9. The display apparatus according to claim 1, wherein the plurality of displays is arranged in a 2×2 array.

10. The display apparatus according to claim 1, wherein each of the plurality of displays further comprises:
a light source driving unit configured to:
drive the plurality of light sources; and
cause the first current to be provided to the first light source and the second current to be provided to the second light source.

11. The display apparatus according to claim 1, further comprising one or more controllers configured to cause the first current to be provided to the corresponding first light source and the second current to be provided to the corresponding second light source for each of the plurality of displays.

12. The display apparatus according to claim 1, further comprising:
a controller configured to control the plurality of displays,
a temperature sensor configured to sense a temperature of one or more of the plurality of displays; and
a fan,
wherein the controller is further configured to cause the fan to operate when the sensed temperature is higher than or equal to a threshold temperature.

13. The display apparatus according to claim 1, wherein the first area of the circuit board surrounds the second area.

14. The display apparatus according to claim 1, wherein:
the plurality of light sources further comprises a third light source disposed at a third area of the circuit board adjacent to a corner of the bezel;
a third current larger than the first current is provided to the third light source; and
the first area and the third area are disposed between the bezel and the second area.

15. A display apparatus comprising:
a plurality of displays adjacently arranged, wherein each of the displays comprises:
a plurality of light sources;
a bezel surrounding the plurality of light sources; and
a light source driving unit, wherein the plurality of light sources comprises a first light source disposed at a first area of a circuit board and a second light source disposed at a second area of the circuit board, wherein the first area is adjacent to the bezel and the second area is surrounded by the first area, wherein the light source driving unit is configured to cause a first current to be provided to the first light source and a second current to be provided to the second light source, wherein the second current is smaller than the first current, and wherein the display apparatus further comprises:

a guide panel disposed at a side of the circuit board; and a diffusion sheet supported by the guide panel and disposed over the plurality of light sources.

16. The display apparatus according to claim 15, wherein each of the displays further comprises a panel, and wherein a same level of display brightness is achieved across a displayed image at the panel when the first current is provided to the first light source and the second current is provided to the second light source.

17. The display apparatus according to claim 15, wherein the plurality of displays comprises:

a first display adjacent to a second display, wherein the plurality of light sources further comprises a third light source disposed at a region of the first area adjacent to the second display, and wherein the light source driving unit is further configured to cause a third current to be provided to the third light source wherein the third current is smaller than the first current and larger than the second current.

18. The display apparatus according to claim 15, wherein each of the displays further comprises a panel, and wherein a level of the first current is determined based on a distance between the plurality of light sources and the panel.

19. The display apparatus according to claim 15, wherein a difference between the first current and the second current is determined based on a distance between the first light source and the second light source.

20. A display apparatus comprising:

a plurality of displays adjacently arranged;

a controller configured to control the plurality of displays;

a temperature sensor configured to sense a temperature of one or more of the plurality of displays; and a fan, wherein each of the plurality of displays comprises:

a panel;

a bezel surrounding the panel; and a plurality of light sources disposed on a circuit board and configured to output light to the panel, wherein the plurality of light sources comprises a first light source disposed at a first area of the circuit board and a second light source disposed at a second area of the circuit board, wherein the first area is adjacent to the bezel, wherein a first current is provided to the first light source and a second current is provided to the second light source and the second current is smaller than the first current, and wherein the controller is further configured to cause the fan to operate when the sensed temperature is higher than or equal to a threshold temperature.

* * * * *